United States Patent
Mang et al.

(10) Patent No.: US 9,435,456 B2
(45) Date of Patent: Sep. 6, 2016

(54) VALVE

(71) Applicant: SVM Schultz Verwaltungs-GmbH & Co. KG, Memmingen (DE)

(72) Inventors: Helmut Mang, Memmingen (DE); Gerhard Albrecht, Memmingen-Steinheim (DE)

(73) Assignee: SVM Schultz Verwaltungs-GmbH & Co. KG, Memmingen (DE)

( * ) Notice: Subject to any disclaimer, the term of this patent is extended or adjusted under 35 U.S.C. 154(b) by 10 days.

(21) Appl. No.: 13/937,474

(22) Filed: Jul. 9, 2013

(65) Prior Publication Data

US 2014/0008558 A1 Jan. 9, 2014

(30) Foreign Application Priority Data

Jul. 9, 2012 (DE) .................. 10 2012 106 134

(51) Int. Cl.
*F16K 31/04* (2006.01)
*F16K 31/06* (2006.01)

(52) U.S. Cl.
CPC .......... *F16K 31/04* (2013.01); *F16K 31/0668* (2013.01); *Y10T 137/86759* (2015.04); *Y10T 137/86799* (2015.04)

(58) Field of Classification Search
CPC .............. F16K 31/04; F16K 31/0668; Y10T 137/86759; Y10T 37/86791; Y10T 137/86799
USPC .......................... 137/625.33, 625.37, 625.38; 251/129.02, 129.07, 50, 52, 360, 362
See application file for complete search history.

(56) References Cited

U.S. PATENT DOCUMENTS

| | | | | |
|---|---|---|---|---|
| 1,119,287 | A * | 12/1914 | Krichbaum | 137/460 |
| 2,667,896 | A * | 2/1954 | Kanuch | 251/52 |
| 5,067,522 | A * | 11/1991 | Ligh | 137/625.33 |
| 7,273,206 | B2 * | 9/2007 | Sato et al. | 251/129.15 |
| 7,588,229 | B2 * | 9/2009 | Eiser et al. | 251/129.02 |
| 7,857,282 | B2 * | 12/2010 | Goossens | 251/129.07 |
| 8,322,499 | B2 | 12/2012 | Schmidt et al. | |
| 2006/0076065 | A1 * | 4/2006 | Bowe | 137/625.33 |
| 2006/0149877 | A1 * | 7/2006 | Pearson | G06F 13/24 710/260 |
| 2010/0264340 | A1 | 10/2010 | Kratzer | |

FOREIGN PATENT DOCUMENTS

| | | |
|---|---|---|
| DE | 10 2007 005 466 A1 | 8/2007 |
| DE | 10 2007 035 542 A1 | 4/2008 |
| DE | 10 2008 015 415 A1 | 10/2009 |
| DE | 10 2008 035 899 A1 | 2/2010 |
| DE | 102008035899 * | 4/2010 ............ F16K 31/06 |

OTHER PUBLICATIONS

Machine Translation of DE102008035899 (retrieved Nov. 13, 2015).*
Office Action for a German Patent Application No. 10 2012 106 134.3 dated Jun. 29, 2016 (15 pages, including an English translation thereof).

* cited by examiner

*Primary Examiner* — Michael R Reid
(74) *Attorney, Agent, or Firm* — Goodwin Procter LLP

(57) ABSTRACT

A valve comprising a drive part having a valve block with at least one outlet opening; a valve part having a tappet that can be moved by a drive, wherein the tappet opens or closes the outlet opening depending on its position; and a spring that is disposed between the valve block and the tappet.

20 Claims, 3 Drawing Sheets

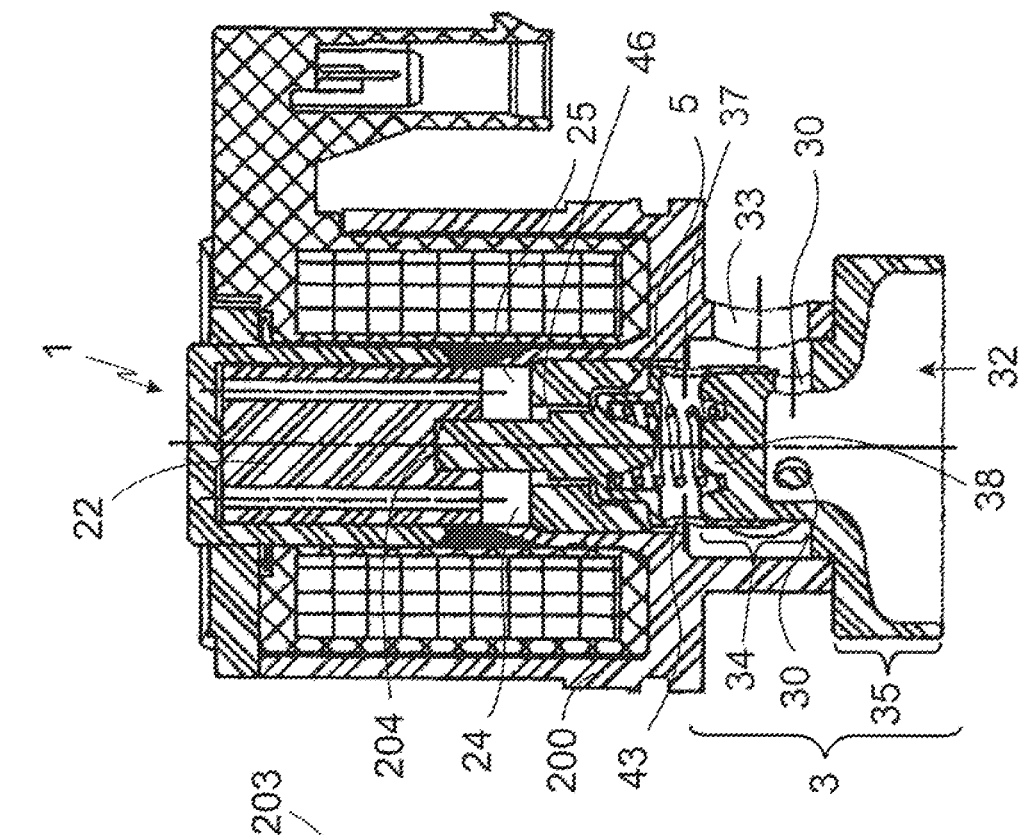
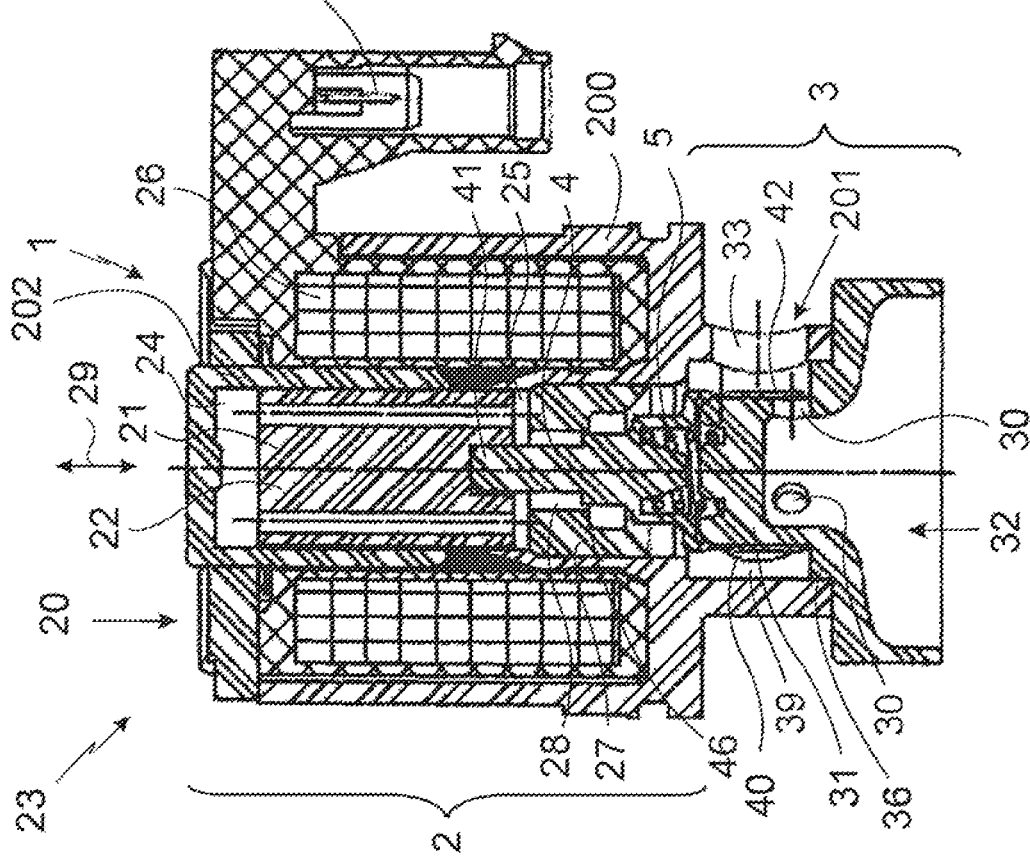
Fig. 1a
Fig. 1b

VALVE

CROSS-REFERENCE TO RELATED APPLICATIONS

This application claims priority to German Patent No. 10 2012 106 134.3, filed Jul. 9, 2012, the complete disclosure of which is incorporated by reference herein.

BACKGROUND OF THE INVENTION

The invention refers to a valve consisting of a drive part and a valve part wherein the valve part has a valve block with at least one outlet opening as well as a movable tappet, wherein the tappet is in operative connection with the drive element moved by the drive, and the tappet, depending on its position, opens or closes the outlet opening.

Above-mentioned valves are widely known, for example, in the form of spool valves. Skillfully, the arrangement is chosen such that the tappet is guided on the valve block. Depending on the position of the slider, the at least one outlet opening, located in the valve block, is opened or closed. For the movement, in particular the linear movement of the movable tappet, a drive element of the drive is provided, wherein the drive requires, of course, the appropriate power. Typically, as a drive, for example, a solenoid, and as a drive element the armature or the armature rod of the solenoid is used, without restricting the invention thereto.

BRIEF SUMMARY OF THE INVENTION

Now, it is a problem of the present invention to improve a valve as initially described such that the opened position is kept with as little energy as possible.

In order to solve this problem, the invention refers to a valve as described in the beginning, and suggests that between valve block and tappet a spring is arranged, and the drive element angles the tappet against the return force of this spring.

By skillfully positioning the spring between valve block and tappet, the drive element presses the tappet against the return force of the spring on the valve block when the outlet opening, that is the valve altogether, has to be closed. This stored energy is then available to reliably reset the tappet when the valve/outlet opening is in the opened position, so reliably that the opened position is held open with very low effort, in particular very low power or electricity consumption.

The arrangement can be configured in particular very space-saving as the spring is arranged in the gap, that is there anyway, between valve block and tappet. The result is the advantage that the dimensions of installation do not change.

In another preferred embodiment of the invention it is provided that the tappet is configured pot-like at its end facing the valve block, and is guided on the valve block.

The pot-like design of the tappet, in particular in the area of the valve block, forms the space wherein the spring is inserted. The spring is here arranged in the interior of the pot of the tappet. This preferred embodiment of the tappet also has the advantage of the tappet becoming somewhat lighter altogether, thus less mass has to be moved leading to a lower energy consumption and also to a more convenient dimensioning of the spring.

Another result of the pot-like design of the tappet is also an annular projection serving for the guiding function of the tappet on the valve block, configured correspondingly thereto. The pot-like configured tappet is put here with its open end on the valve block and is guided thereon.

In another preferred embodiment of the proposal, the tappet is designed pin- or sleeve-like at its end facing the drive element. The arrangement is chosen such that the diameter of the tappet in a longitudinal direction (this also corresponds with the direction of movement of the tappet) does not remain constant but changes. Skillfully, the area of the tappet facing the drive element has here the smallest diameter, as this is already sufficient, on the one hand, for, if necessary, provided guide sections, but also for the transmission of the movement from the drive element to the tappet. At the end of the tappet opposite of the drive element, then the pot-like design is provided that takes over, in particular, the guide function on the valve block. The tappet has been formed here alternatively, from solid material in a metal-cutting step, wherein then the area of the tappet facing the drive element is manufactured pin-like, that is it consists of solid material, or sleeve-like, that is it is hollow inside, which again reduces the weight and the mass, respectively, of the tappet in a smart way.

Furthermore, it is provided that tappet and drive element are manufactured independently as separate elements, and rigidly connected. This makes it possible to transmit the movements imprinted in the driving element immediately to the tappet. The fact that the two elements are manufactured independently further has the advantage that the respective material selection can be adapted perfectly to the respective purpose.

In another embodiment according to the invention the tappet and the drive element are connected to each other by force action, in particular in the direction of movement of the drive element. Tappet and drive element thus are not connected to each other rigidly, but rest on one another with the spring provided between tappet and valve block providing the power by means of which the tappet rests on the drive element against the driving power that is imprinted in the drive element.

It has to be taken into consideration that the drive element is, for example, the armature in a solenoid or also an element driven by an electro-motor. It is also possible that the drive element is part of a linear drive employed as drive according to the invention. Just with drive concepts acting only in one direction the spring is double convenient as thus the withdrawn position that does not require energy can be taken safely and reliably.

Besides the rigid, but two-part configuration of tappet and drive element, the invention also comprises solutions where drive element and tappet are manufactured as one piece (FIG. 1c).

Conveniently, the tappet is designed such that it has, at its pot-like area at the end opposite the drive element, a sealing section interacting with the at least one outlet opening, and, at its pot-like area spaced from the sealing section, at least one ventilation opening.

The tappet, in particular designed like a slider has the function of opening or closing the outlet opening provided at the valve block. In this end section of the tappet, therefore also opposite the drive element, the sealing section is located providing a reliable leakage-free sealing of the outlet opening when the valve is closed.

Conveniently, additionally in the pot-like area of the tappet, conveniently holding the spring, at least one ventilation opening is provided through which this volume is in pressure compensation, and can be ventilated. Seen in the direction of movement, the ventilation opening is spaced apart from the sealing section.

The longitudinal extension of the outlet opening is orientated angled, in particular perpendicularly to the direction of movement of the drive element of the tappet. The outlet opening, however, can also be designed curved as an alternative.

According to the invention, for designing the tappet a multitude of different embodiments is provided. For example, the tappet is designed in one or multiple parts, wherein in the multiple part version different sections of the tappet can be associated with different materials and therefore also different qualities, in particular, for example in view of the employed drive (magnetism). However, if the tappet consists of multiple parts, the manufacturing of the rather complex tappet can be made easier. Thus, it is provided, for example, that the tappet as a whole or at least single parts of the tappet have been manufactured by a punch or press process, in particular in a cold forming process. It is convenient for the different manufacturing processes that can be applied, when the tappet consists of multiple parts.

It is a big advantage when a slideway of the tappet is provided on the valve block. The slideway prevents or reduces wear, and is also energy-efficient. However, at the same time it has to be taken into consideration that the sealing section of the tappet seals the outlet openings reliably. The slideway can be realized, for example, as sliding coating or a film bearing of the tappet on the valve block, wherein the sliding coating is arranged either on the surface of the tappet facing the valve block, or on the surface of the valve block facing the tappet, or, of course, on both surfaces. An improvement of the guide is achieved also by hardening the interacting materials or surfaces, wherein here in particular a hardening by means of a diffusion process at low temperature (less than 300 degrees centigrade) is provided where a large amount of carbon is diffused. The carbon is solved here in interstitial sites, and thus does not form carbides. Diffusing of a large amount of carbon causes a considerable pressure tension at the metal surface leading to a very large surface hardness. This process is in particular advantageous, as it does not change the other material qualities of the used tool steel. These are, in particular, corrosion resistance, however, also the non-magnetic condition. Such a process can also be realized on geometrically difficult places, for example on insides, pocket holes and so on.

The valve block and the tappet, respectively, are manufactured preferably from machining steel or generally from metal.

Skillfully, a solenoid is provided as drive where the armature arranged movably in the armature space is moved as drive element when a magnetic coil carrying windings of current conducting wire is electrified, in order to reduce or close a working air gap. The electro-magnetic drive concept is not the only drive concept according to the invention, also other concepts, such as, for example, electro-motor, linear drive can be provided.

Skillfully, the armature space is limited by a magnetic core, and the magnetic core has a penetration opening for the tappet, in particular the pin-like section of the tappet. Furthermore, it is provided that the working air gap is located between the magnetic core and the armature side facing the magnetic core. The spring is supported, on the one hand, on the movable tappet, and, on the other hand, on the valve block. The air gap is here located at the magnetic core in the armature space. The spring is provided outside the armature space spaced from the armature in the direction of movement of the armature. When the current flow is activated the armature is moved in the direction of the core to reduce or close the working air gap, wherein at the same time the tappet is shifted such that the sealing section seals the at least one outlet opening. At the same time also the spring is compressed, and thus the energy store is charged that serves, when the solenoid is switched off, for a return movement of the tappet, and thus also of the connected or contacting armature drive element.

BRIEF DESCRIPTION OF THE DRAWINGS

In the drawing the invention is shown schematically in particular in an example. In the figures:

FIGS. 1a, 1b, and 1c the valve according to the invention in a sectional view each in the closed position (FIG. 1a), the opened (FIG. 1b) position, and including the tappet and drive element as a single piece (FIG. 1c).

In the figures identical or corresponding elements are referred to by the same reference numbers each time, and therefore are, if not necessary, not described anew.

DETAILED DESCRIPTION OF THE EMBODIMENTS

Figure 1C:
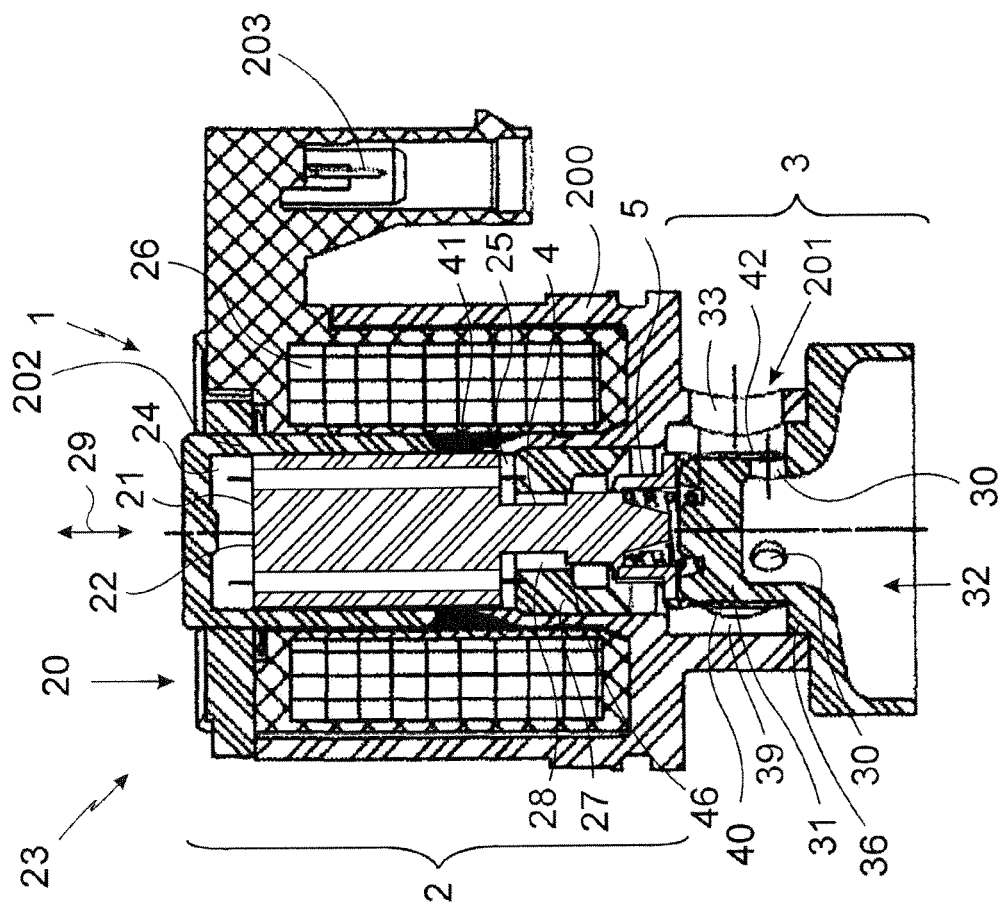

FIG. 1a and FIG. 1b, respectively, show the valve 1 according to the invention in an embodiment. It consists of the drive part 2 that is realized in the embodiment shown here as solenoid 23. Furthermore, the valve 1 has a valve part 3 integrated in the hydraulic or pneumatic cycle (not shown here in detail). Parts of this cycle are the inlet 32, the outlet opening 30, as well as the outlet 33 wherein the function of inlet 32 and outlet 33 can also be vice versa with reference to the outlet opening 30.

The valve is suitable for controlling pneumatic or hydraulic functions, that is the control of media in liquid or gas phase.

The valve part 3 has the valve block 31, that is generally shaped funnel-like and has in its upper area facing the drive part 2 an essentially cylinder-shaped section 34 that also shows the at least one (for example here two or three) outlet opening(s) 30 joined by a widening area 35 opposite the drive part 2 and forming the inlet 32. The valve block 31 is here connected to the housing 200, for example flanged, welded on, glued on, soldered on, caulked or held in a press fit. Cleverly, the housing 200 also has an opening 201 communicating with the outlet opening 30 of the valve block 31 and thus forming the outlet 33.

The valve block 31 has here a connecting ring 36 that is in contact with the end of the inside of the housing 200. The diameter of the connecting ring 36 is more than the diameter of the cylindrical section 34, but less than the diameter of the widening area 35. The connecting ring 36 is located between the cylindrical section 34 and the widening area 35.

In the area of the cylindrical section 34, between the valve block 31 and the housing 200 an annular gap 39 forms serving for conducting the medium and in which also the pot-like section 40 of the tappet 4 moves. The annular gap 39 is connected with the inlet 32 via the at least one outlet opening 30, and with the outlet 33 via the opening 201.

The drive part 2 is configured in the example shown here as solenoid 23. Generally, a drive part 2 consists of a drive 20, that may be configured in any way, acting on a drive element 21 and providing, in the example shown here, a linear movement of the drive element 21. The direction of movement of the drive element 21 is indicated by the double arrow 29. The drive element 21 is here in operative connection with the tappet 4 that again opens or closes slider-like—depending on the position of the drive element 21—the outlet openings 30.

In the example shown here the concept of a drive 20 is realized as a solenoid, the drive element 21 is an armature 22 supported longitudinally movably in an armature space 24. The solenoid 23 has a magnetic coil 26 encircling at least partly the armature space 24. The magnetic coil 26 carries a multitude of windings of current-conducting wire, wherein the magnetic coil generates a magnetic field when electrified, the magnetic field lines of the magnetic field being in particular in the interior of the coil and therefore also in the armature space 24 essentially axially parallel to the axis of the coil 26, and moving the armature 22, that can be magnetized or consists of magnetic material, longitudinally, according to the polarity of the generated magnetic field in order to reduce or close a working air gap 25. 203 indicates the connecting contacts for the power supply of the magnetic coil 26.

The movement of the drive element 21 or the armature 22 thus generated acts against the resetting effect of a spring 5 that shifts, when the current flow through the magnetic coil 26 is switched off, the drive element 21 or the armature 22 back in the starting position, and again enlarges or opens the working air gap 25.

The armature space 24 is limited by a sleeve-like pole tube 202 that is open on one side in order to allow the armature 22 to be built in. The pole tube 202 is put in the magnetic coil 26 and held by the housing 200. The pole tube 202 is designed like a pot or pocket hole, that means open on one side. After inserting the armature 22, the open end of the armature space 24 is closed by the magnetic core 27. The magnetic core 27 has a penetration opening 28 for passing through a component transmitting the movement of the drive element 21/armature 22 to the tappet 4. The working air gap is, in the example shown here, located between the magnetic core 27 and the drive element 21 or the armature 22.

In the example shown here, the tappet 4 has a pin-like area 41 facing the drive element 23/armature 22 projecting through the penetration opening 28 of the magnetic core 27 and immersing in a recess 204 of the armature 22. The tappet 4 is divided in a pot-like area 40 (see in particular FIG. 2) and a pin-like area 41. In particular the section of the pot-like area 40 of the tappet 4 opposite the pin-like area 41 is guided on the preferably cylindrical valve block 31 or is slid thereon. The spring 5 is located between the valve block 31 and the tappet 4. The spring 5 is in particular inserted in the pot-like area 40 of the tappet 4, and does not require additional construction space in the valve according to the invention. On the bottom 400 of the pot-like area 40 here an annular groove 44 is provided surrounding the retaining positioning pin 45 (as pot-like end of the pin-like area 41 of the tappet 4). The retaining positioning pin 45 thus forms a guide for the spring 5.

Also the upper side of the valve block 31 facing the drive part 2 has an annular groove 37 surrounding a corresponding retaining positioning pin 38, and provides a good bearing and guide for the spring 5 with reference to the valve block 31.

Figure 2:
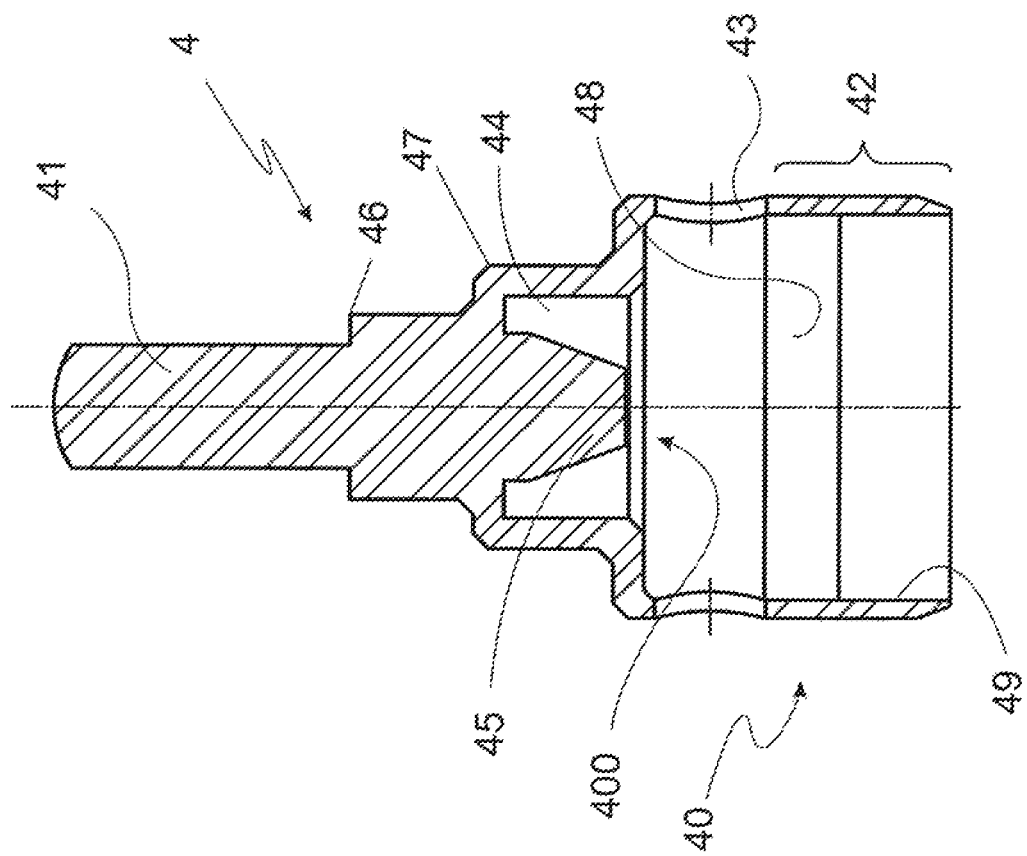
FIG. 2 in a sectional view a partial enlargement of the tappet of the valve according to the invention.

The pin-like section 41 has two collars 46, 47 (FIG. 2). A shoulder where the exterior diameter of the pin-like section 41 widens is herein referred to as collar 46, 47. The first collar 46 facing the drive element 21/armature 22 is, when built in, positioned such that it can plunge in the penetration opening 28 of the magnetic core 27. This can be seen clearly in comparison with the position of the collar 46 in FIGS. 1a, 1b. Also the switching behavior or the magnetic response can be set by means of the position of the collar 46 relatively to the penetration opening 28.

The second collar 47 facing more the valve part 3 is the transition or the connection of the pot-like area 40 to the pin-like section 41. The area joining the second collar 47 encircles the annular groove 44, and widens again at the end of the annular groove 44 in an essentially cylindrical, in particular pot-like area 40 having at its bottom end the sealing section 42 by means of which the tappet 4—depending on the position of the tappet 4—opens and releases, respectively, or seals leakage-free the outlet opening 30 of the valve block 31.

At the inner area of the pot-like area 40 of the tappet 4 joining the sealing section 42 and facing the bottom 400, at least one ventilation opening 43 joins through which the inner volume 48 of the tappet 4 is pressure-compensated against the conduct area (in particular the inner space of the housing 200, for example the annular groove 39) that is pressurized by media.

The pot-like area 40 has on its inner side at its terminal face also showing the sealing section 42 a slide or guide surface 49 that is movably guided or supported on the valve block, in particular on the circumferential surface of the preferably cylindrical valve block 31. For an easy operation of the tappet 4, a suitable slideway or hardening at the slide or guide surface 49 and/or the also corresponding lateral surface of the valve block 31 are provided.

FIG. 1b shows the NO (normally open) valve position. When there is no energy consumption, that means without current flow through the magnetic coil 26, the tappet 4 is, because of the relaxed spring 5 arranged between the tappet 4 and the valve block 31, shifted upwards such that also the tappet 4, in particular the sealing section 42 releases the outlet opening 30 arranged in the valve block 31.

FIG. 1a shows the closed position of the valve, where the solenoid is flow through by current, that means consumes energy.

The valve according to the invention can be configured as control valve as well as proportional valve.

Although the invention has been described in terms of specific embodiments which are set forth in considerable detail, it should be understood that this is by way of illustration only, and that the invention is not necessarily limited thereto, since alternative embodiments and operating techniques will become apparent to those skilled in that art in view of the disclosure. Accordingly, modifications are contemplated which can be made without departing from the spirit of the described invention.

The invention claimed is:
1. A solenoid valve comprising:
a drive solenoid including a drive element; and
a valve part, at least a portion of which is contained within a housing, the valve part comprising:
    a valve block contained within the housing and comprising a substantially cylindrical portion having at least one outlet opening,
    a widening portion of increased volume and outside of the housing, and
    a connecting ring formed between the cylindrical portion of the valve block and the widening portion and in contact with an end of an inside of the housing; and
    a movable tappet in operative connection with the drive element of the drive solenoid, the tappet structured and arranged to open and close the at least one outlet opening depending on a position of the tappet, and a spring arranged between the valve block and the tappet, the drive element angling the tappet against a return force of the spring, the tappet including a pot-like area having:
- a bottom,
- a positioning pin for guiding the spring, and
- a terminal face disposed about at least a portion of the valve block and having at least one of a slide surface and a guide surface for sliding the tappet on the valve block and
- a sealing section covering the at least one outlet opening upon movement of the tappet, the positioning pin surrounded by an annular groove provided in the bottom of the pot-like area.

2. The valve according to claim 1, wherein the pot-like area of the tappet is at an end of the tappet facing the valve block, and is guided on the valve block.

3. The valve according to claim 1, wherein the tappet is configured pin-like at its end facing the drive element.

4. The valve according to claim 1, wherein the tappet and the drive element are manufactured independently from each other and connected to each other rigidly.

5. The valve according to claim 1, wherein the drive element and the tappet comprise a single part.

6. The valve according to claim 1, wherein the pot-like area of the tappet is at an end of the tappet facing the valve block and the pot-like area has at least one ventilation opening, with the tappet featuring the sealing section at its pot-like area at an end opposite the drive element, and the at least one ventilation opening spaced from the sealing section.

7. The valve according to claim 6, wherein the at least one ventilation opening includes a longitudinal extension that is orientated at an angle from a drive direction.

8. The valve according to claim 1, wherein the tappet is configured in at least one part.

9. The valve according to claim 1, wherein at least a portion of the tappet is manufactured by at least one of a punching process and a pressing process.

10. The valve according to claim 1, further comprising at least one of a slideway and a hardening of interacting surfaces of the tappet.

11. The valve according to claim 1, wherein the drive element comprises an armature supported movably in an armature space, such that when a magnetic coil carrying windings of current-conducting wire is electrified, the armature is moved to reduce or close a gap of working air.

12. The valve according to claim 11, wherein the solenoid comprises a magnetic core having an opening for translation of the tappet within the magnetic core, wherein the armature space is limited by the magnetic core.

13. The valve according to claim 11, wherein the solenoid comprises a magnetic core, and the gap of working air is located annularly about the armature, between the magnetic core and the armature.

14. The valve according to claim 9, wherein at least a portion of the tappet is manufactured in a cold forming process.

15. The valve according to claim 10, wherein the slideway comprises at least one of a sliding coating and a film bearing of the tappet on the valve block.

16. The valve according to claim 12, wherein the magnetic core has a recessed opening for receiving the pin-like area of the tappet.

17. The valve according to claim 1, wherein the spring is contained within the pot-like area of the tappet.

18. The valve of claim 1, wherein the spring is provided outside of an armature space into which the drive element comprising an armature is operatively disposed.

19. The valve of claim 1, wherein an upper side of the cylindrical valve part comprises:
- a positioning pin for guiding the spring, and
- an annular groove surrounding the positioning pin for retaining the spring.

20. A solenoid valve comprising:
- a drive part having a drive element that is drivable by a drive solenoid; and
- a valve part, at least a portion of which is contained within a housing, the valve part comprising:
  - a cylindrical-valve block contained within the housing and comprising a substantially cylindrical portion having at least one outlet opening,
  - a widening portion of increased volume and outside of the housing, and
  - a connecting ring formed between the cylindrical portion of the valve block and the widening portion and in contact with an end of an inside of the housing;
  - a movable tappet having a pot-like area, the tappet in operative connection with the drive part to open or close the at least one outlet opening depending on a position or the tappet; and
  - a spring disposed between the valve block and the tappet, such that the drive element angles the tappet against a return force of the spring,
- wherein the pot-like area of the tappet includes a sealing section that surrounds a cylindrical-shaped portion of the valve block and that covers and uncovers the at least one outlet opening upon movement of the tappet.

* * * * *